Oct. 24, 1967  H. R. PLUMMER  3,348,434
BORING BAR ASSEMBLY FOR DEEP HOLE BORING
Filed June 29, 1965  3 Sheets-Sheet 1

INVENTOR
HARVEY R. PLUMMER by: Wolfe, Hubbard, Voit & Osann
ATTYS.

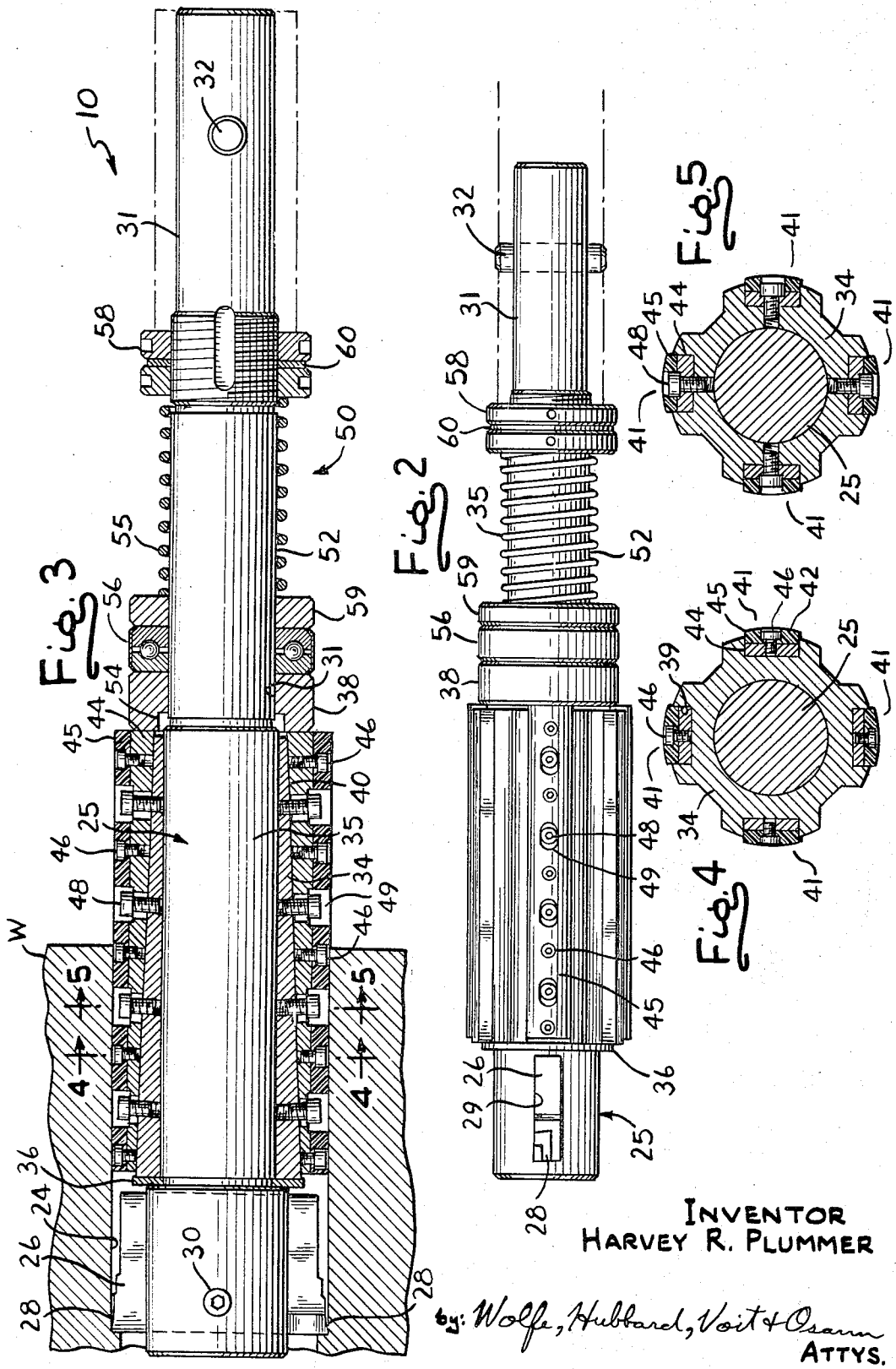

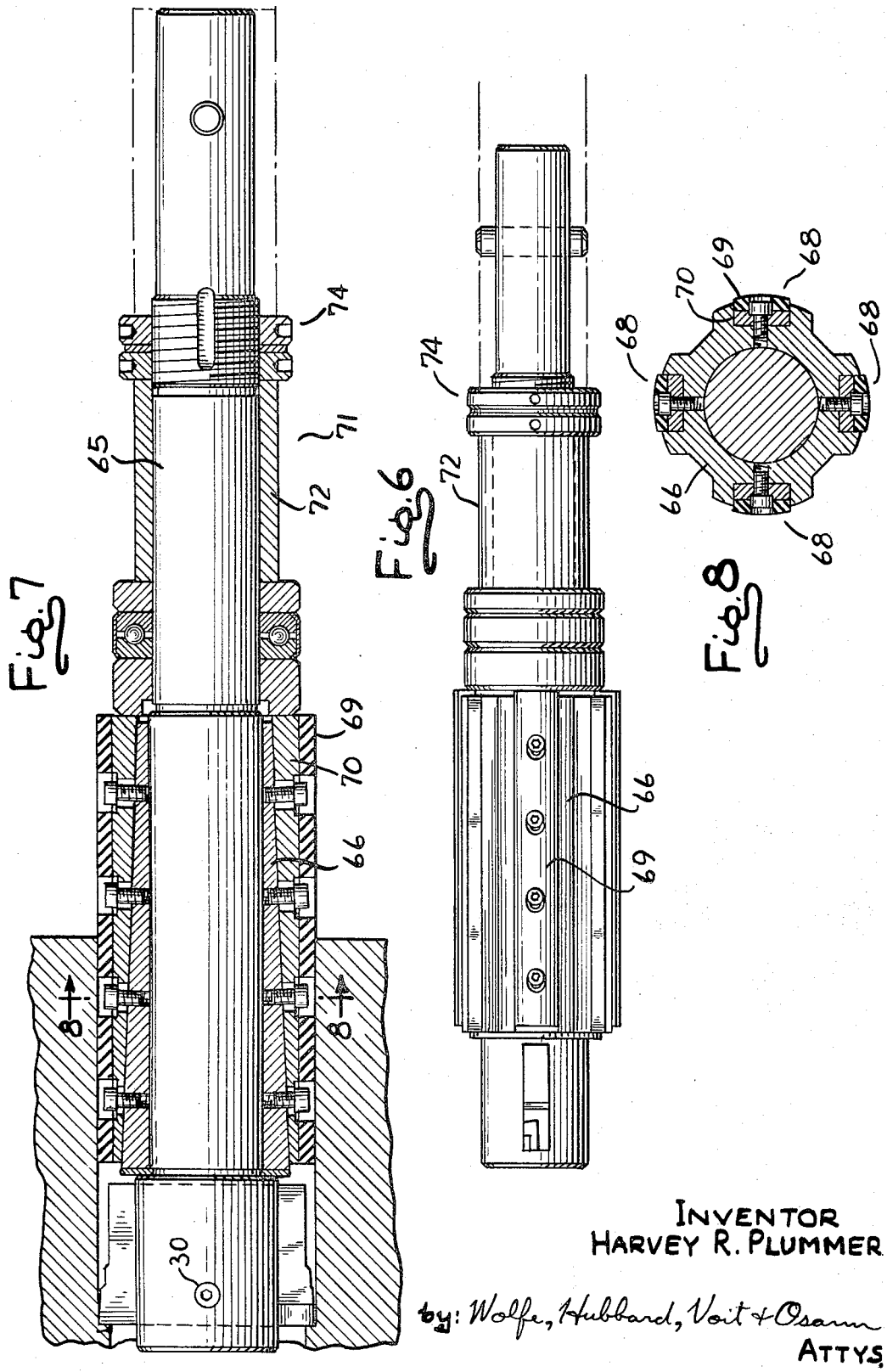

3,348,434
BORING BAR ASSEMBLY FOR DEEP
HOLE BORING
Harvey R. Plummer, Fond du Lac, Wis., assignor to
Giddings & Lewis Machine Tool Company, Fond du
Lac, Wis., a corporation of Wisconsin
Filed June 29, 1965, Ser. No. 468,061
4 Claims. (Cl. 77—58)

The present invention relates generally to the machine tool field and, more specifically, to an improved boring bar assembly particularly, but not exclusively, adapted for deep hole boring.

By common usage in the art, the expression "deep hole boring" connotes the machining of a bore having a length greater than ten times its diameter. Deep hole boring operations are utilized in a wide variety of workpieces, such as hydraulic cylinders, pipe molds, rifle barrels, turbine rotor shafts, and rolling mill rolls.

In performing a deep hole boring operation, it is necessary to support the boring cutter accurately for the full length of the bore. This is customarily done by machining a pilot bore to the required size and utilizing a support in the form of a follower bearing on the deep hole boring bar immediately behind the cutting tool. The pilot bore serves to receive and initially locate the follower bearing and the latter pilots the boring bar from the finished bore and thus supports the boring cutter as the same traverses the full length of the bore.

Deep hole boring operations are complicated by the fact that the size and condition of a deep hole bore tends to change as the cut progresses. This is due to tool wear and other variable factors involved in the cutting action. A common condition experienced in such an operation is a gradual tapering of the bore to a smaller size as the tool wears in the course of the cutting operation. This change in bore size creates a problem by tending to impede the axial movement of the follower bearing along the bore.

Heretofore, a number of attempts have been made to provide radial adjustment of follower bearings to accommodate the taper of a finished bore. A number of these constructions have introduced radial resiliency at the sacrifice of radial support, or have involved cumbersome manual adjustments requiring removal of the boring bar assembly from the bore. Such constructions have met with varying degrees of success and have left much to be desired in bore accuracy and production time.

One object of the present invention is to provide a deep hole boring bar assembly having a follower bearing support including means for automatic adjustment to accommodate variations in bore size incident to the cutting operation.

Another object of the invention is to provide a boring bar assembly of the character set forth and having a follower bearing support adapted to furnish maximum rigid radial support to the boring tool, minimizing chatter, reducing production time, and increasing bore accuracy.

A further object of the invention is to provide a boring bar assembly of the foregoing type having a follower bearing support adapted to maintain substantially constant bearing pressure contact with the finished bore.

Still another object of the invention is to provide a deep hole boring bar assembly with a follower bearing support susceptible of adjustment without removal of the boring bar assembly from the bore.

Other objects and advantages will become apparent as the following description proceeds, taken together with the accompanying drawings, wherein:

FIG. 2 is an enlarged plan view of the boring bar assembly shown in FIG. 1.

FIG. 3 is a further enlarged vertical sectional view taken longitudinally of the boring bar assembly of FIG. 1 and a portion of the workpiece which is being bored.

Figure 1:
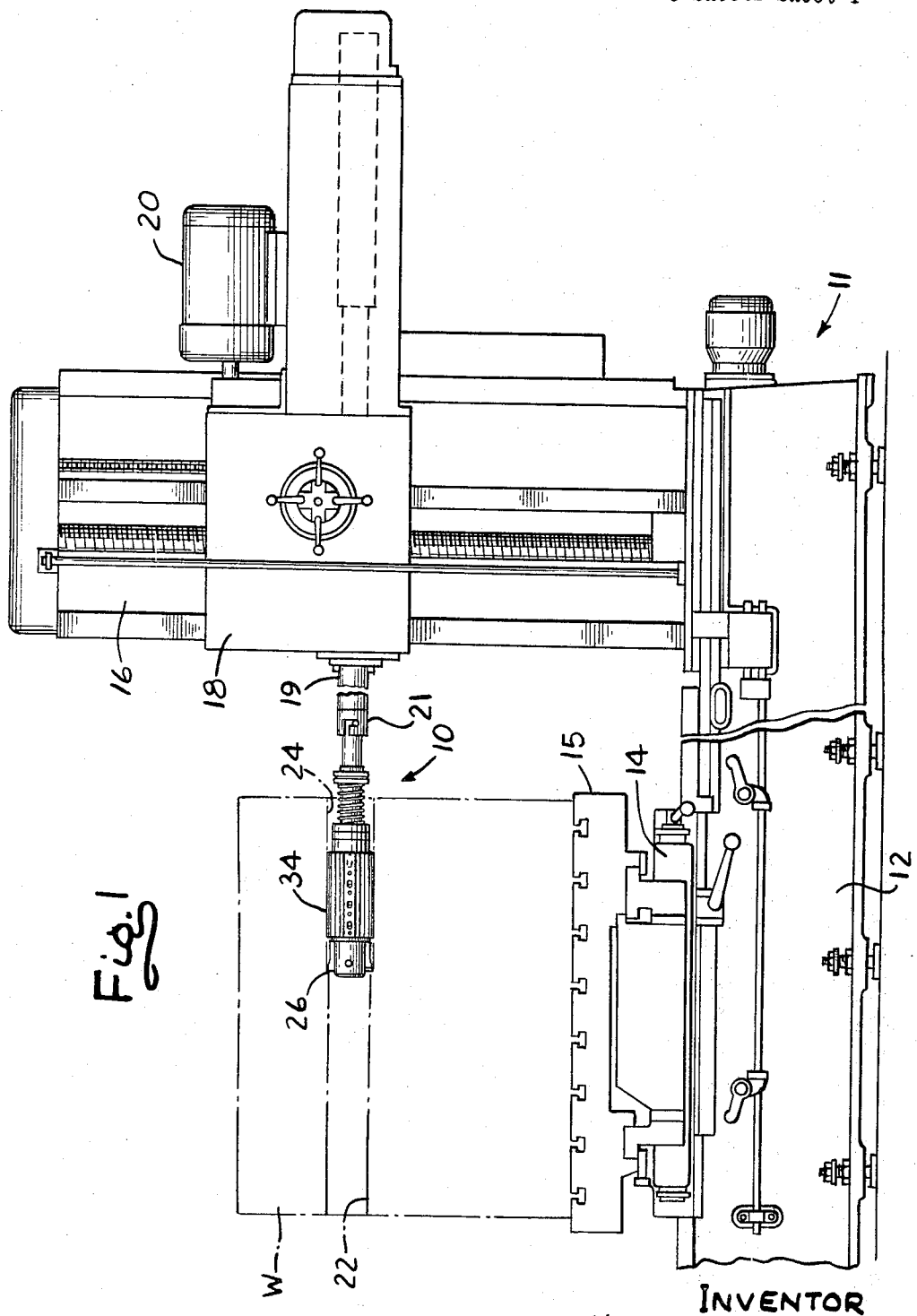
FIG. 1 is a side elevational view of an illustrative boring bar assembly exemplifying the present invention, the assembly being mounted in operative position in the spindle of a horizontal boring machine.

FIGS. 4 and 5 are transverse sectional views through the boring bar assembly as shown in FIG. 3, taken in the planes of the lines 4—4 and 5—5, respectively.

FIG. 6 is a plan view similar to FIG. 2 but showing a modified form of bearing bar assembly also embodying the invention.

FIG. 7 is a further enlarged vertical sectional view taken longitudinally of the boring bar assembly of FIG. 6.

FIG. 8 is a transverse sectional view through the boring bar assembly of FIG. 7, taken in the plane of the line 8—8.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more particularly to FIGS. 1 through 5, the invention is there exemplified in an illustrative boring bar assembly 10 mounted in operative position in a horizontal boring machine 11. The latter comprises a bed 12 having ways on its top surface which support a saddle 14 for longitudinal sliding movement thereon. The saddle, in turn, has crossways which support a worktable 15 for transverse sliding movement thereon. A workpiece W which is to have a deep hole boring operation performed thereon is mounted on the table 15 in any suitable manner.

An upstanding column 16 fixed to one end of the base carries a headstock 18 adapted to be vertically positioned thereon. The headstock has a spindle 19 mounted therein powered as by means of a drive motor 20 and adapted to be rotatably and axially driven. The projecting end of the spindle is provided with a bayonet lock coupling element 21 adapted to receive and engage a suitable coupling means on the boring bar assembly 10. The workpiece W to be bored may have a drilled or cored hole 22 formed therein prior to the boring operation. As shown, the boring bar assembly has traversed the hole 22 axially, producing a finished bore 24 in the workpiece.

The boring bar assembly 10 comprises a bar 25 having a cutter 26 adjacent its outboard end. In this instance, the cutter is formed as a rectangular block with a pair of diametrically opposed cutter bits 28. The block is mounted in a diametrical slot 29 in the bar 25 and secured in place as by means of a transverse tapered screw 30. The other end of the boring bar assembly is provided with a shank 31 and transverse pin 32. These parts comprise the male half of a rotary and axial drive coupling, the female portion 21 of which is secured in the end of the spindle 19.

In accordance with the invention, a relatively thin shelled follower bearing support 34 is journaled on the bar intermediate the ends thereof having means mounted thereon for automatic adjustment to accommodate variations in bore size and to maintain substantially constant bearing pressure contact with the finished bore. The follower bearing support 34 is axially supported for relative rotation on a cylindrical surface 35 of the bar 25 behind the cutter 26 and between a washer 36 and a thrust washer 38.

The follower bearing support is provided in this instance with four equally spaced, longitudinal, peripheral grooves 39, the bottom surface 40 of which is tapered relative to the axis of the bar 25. The grooves 39 are adapted to receive wear shoes 41 which have a tapered side complementary to the bottom surface 40 and a straight side 42 arcuate in cross-section to provide a wear surface complementary to the bore size. In the illustrated form each wear shoe 41 is comprised of a tapered inner layer 44 of solid bearing material and a separate liner 45 made of laminated plastic. The plastic liner 45 of each shoe is secured to the inner layer 44 by means of screws 46 which are threaded into the inner layer 44 and the heads of which are secured in counterbored holes in the plastic liner 45. Each shoe 41 is secured to the follower bearing support 34 as by means of screws 48 threaded into the follower and the heads of which are secured in counterbored and elongated holes 49 in the shoe. The shoes 41 are positioned on the follower bearing support 34 in such a manner that the thick ends of the shoes project beyond the end of the follower. The screws 48 serve to retain the shoes 41 in the grooves 39 while permitting longitudinal adjustment of the shoes during advancement of the bar 25 into the bore.

The wear shoes 41 are adapted to be biased toward their expanded position by means of a spring loaded thrust assembly 50. In this case, the thrust assembly 50 includes a thrust washer 38 of substantial thickness having a bore 51 closely fitting the bar surface 52 on which it is supported. The thrust washer 38 also is formed with a counterbore 54 to provide clearance for the bearing surface 35 of the bar. A coil compression spring 55 mounted between a thrust bearing 56 and an adjusting nut 58 serves to apply an equalized axial thrust on the four shoes 41. A space washer 59 may be employed as shown between the spring 55 and the bearing 56 if needed to obtain the necessary thrust. The compression spring may be loaded with a desired thrust by adjusting the nut 58 which is made in three pieces including a lock washer 60 to permit locking of the assembly at the desired adjustment.

It should be appreciated that since the wear shoes 41 are externally exposed on the follower bearing support 34, they are easily removable for replacement with other shoes to accommodate larger bores, to provide different bearing material or to replace worn bearing areas.

In operation, the boring bar assembly 10 is inserted in a pilot bore and coupled to the driving spindle 19 of the boring machine. Then with the bar 25 rotating and axial feed applied, the follower bearing support 34 and mounted shoes 41 will slide along the bore 24. The thrust washer 38 in conjunction with the spring assembly will maintain equalized end-pressure on the shoes 41 which extend a distance beyond the end of the follower bearing support 34. As the bore size 24 changes due to tool wear or some other conditions, a change in loading on the shoes 41 causes them to adjust longitudinally against the spring bias automatically causing the diameter of the follower bearing support and shoe assembly to adjust to the new size of the bore.

The use of a boring bar assembly of the type described above can significantly reduce production time since the shoes and the follower automatically adjust to variations in the bore size without the need for removing the assembly from the bore. In addition, the follower bearing support maintains substantially constant bearing pressure with the finished bore while still furnishing the maximum radial rigid support.

A modified form of the boring bar assembly also embodying the present invention is shown in FIGS. 6–9. A boring bar 65 and follower bearing support 66 are provided similar to that described above. The wear shoes 68 mounted on the follower bearing support in this case, however, has strips 69 of resilient material such as neoprene bonded to be tapered interlayer 70 of bearing material. Experience has shown that such strips 69 provide the best bearing material for certain types of work parts. The neoprene wear strips 69 are compressible to some extent and thereby can conform to variations in the contour of the bore while still providing a rigid radial support.

The shoes are biased toward their expanded position by a thrust assembly 71 also similar to that described above except that a rigid spacer 72 is used in place of a spring. In this case, rotation of the nut assembly 74 provides the initial adjustment and the neoprene wear strips 69 accommodate minor changes in the bore size as the bar assembly is advanced into the bore.

Although the invention has been described with respect to bars which rotate while the workpiece remains stationary, it will of course be appreciated that the invention also is applicable to stationary bars and a rotating workpiece as would apply to lathes.

I claim as my invention:

1. A deep hole boring bar assembly comprising, in combination, a boring bar having a cutter adjacent one end thereof and coupling means adjacent the opposite end thereof, a relatively thin shelled follower bearing support journaled on said bar intermediate the ends thereof, said follower bearing support having a plurality of longitudinal grooves the bottom surface of which is tapered relative to the axis of said bar, a plurality of removable elongated wear shoes mounted in said grooves of the follower bearing support, each said wear shoe having a tapered side complementary to said bottom surface of the follower bearing support and a straight side substantially parallel to the axis of said bar, said wear shoes having a strip of plastic bearing material attached to said straight side, said wear shoes being axially movable with respect to said follower bearing support in response to axially displacement of said bar, an adjustable stop on said boring bar adjacent said coupling means, and means adjacent said follower bearing support for transmitting an axial thrust between said adjustable stop and said wear shoes.

2. A deep hole boring bar assembly comprising, in combination, a boring bar having a cutter adjacent one end thereof and coupling means adjacent the opposite end thereof, a relatively thin shelled follower bearing support journaled on said bar intermediate the ends thereof, said follower bearing support having a plurality of longitudinal grooves the bottom surface of which is tapered relative to the axis of said bar, a plurality of removable elongated wear shoes mounted in said grooves of the follower bearing support, each said wear shoe having a tapered side complementary to said bottom surface of the follower bearing support and a straight side substantially parallel to the axis of said bar, said wear shoes having a strip of plastic bearing material attached to said straight side, an adjustable stop mounted externally on said boring bar adjacent said coupling means so as to be easily accessible for modification, means axially adjacent said follower bearing support for transmitting an axial thrust between said adjustable stop and said wear shoes, a thrust bearing and an axial thrust spring interposed in said thrust transmitting means, said axial thrust spring being axially contractable and expansible in response to pressure exerted by said wear shoes upon displacement axially of said boring bar, and said wear shoes being movable with respect to said follower bearing support upon axial displacement of said thrust spring.

3. A deep hole boring bar assembly comprising, in combination, a boring bar having a cutter adjacent one end thereof and coupling means adjacent the opposite end thereof, a relatively thin shelled follower support bearing journaled on said bar intermediate the ends thereof, a plurality of elongated wear shoes mounted on said follower support bearing, said wear shoes having attached strips of resilient material which are adapted to yield locally so as to compensate for bore imperfection upon displacement axially of said boring bar, an adjustable stop on said boring bar adjacent said coupling means, means axially adjacent said follower bearing support to transmitting an axial thrust between said adjustable stop and said wear shoes, and said wear shoes being radially expansible and contractable in response to movement of said adjustable stop.

4. The boring bar assembly of claim 3 in which a thrust bearing and a rigid thrust sleeve are interposed in said thrusts transmitting means.

References Cited

UNITED STATES PATENTS

| | | | |
|---|---|---|---|
| 1,225,745 | 5/1917 | Barnes | 77—58 |
| 2,334,795 | 11/1943 | Smith | 77—58 |
| 2,883,892 | 4/1959 | Tourison | 77—56 |

WILLIAM W. DYER, Jr., *Primary Examiner.*

G. A. DOST, *Assistant Examiner.*